United States Patent [19]

Khetani et al.

[11] 3,722,725

[45] Mar. 27, 1973

[54] PACKAGE FOR PRESSURIZED FLUENT MATERIALS - A

[75] Inventors: Bhupendra N. Khetani, Vernon; Eugene F. Phillips, Rockville, both of Conn.

[73] Assignee: Monsanto Company, St. Louis, Mo.

[22] Filed: Sept. 24, 1970

[21] Appl. No.: 75,095

[52] U.S. Cl. ..................215/1 C, 215/12 R, 220/69
[51] Int. Cl. ..............................B65d 23/00
[58] Field of Search .........215/1 C, 1 R, 100 R, 12 R, 215/13 R; 222/184; 220/69

[56] References Cited

UNITED STATES PATENTS

| | | | |
|---|---|---|---|
| 2,837,245 | 6/1958 | Grebowiec | 215/1 C |
| 3,482,724 | 12/1969 | Heaton | 215/100 R |
| 3,426,102 | 2/1969 | Solak et al. | 260/875 |
| 2,082,838 | 6/1937 | Lindell | 222/184 |

FOREIGN PATENTS OR APPLICATIONS

| | | | |
|---|---|---|---|
| 931,613 | 7/1963 | Great Britain | 215/13 R |
| 1,175,048 | 12/1969 | Great Britain | 215/1 C |

*Primary Examiner*—Joseph R. Leclair
*Assistant Examiner*—Stephen Marcus
*Attorney*—James C. Logomasini, Michael J. Murphy and Neal E. Willis

[57] ABSTRACT

A package for pressurized fluent materials which includes a bottle made of a high strength moldable thermoplastic with a hemispherical base configuration to minimize stress buildup in the bottle as a result of the pressure of the contents. Means are formed in the bottle for cooperating with a support member to maintain the otherwise unstable bottle in an upright position on a horizontal surface. Preferably, the shape of the support member is the same as that of the curved bottom portion of a conventional self supporting bottle for holding carbonated beverages. The thermoplastic of the bottle preferably has a major component therein which is polymerized from a monomer having one or more nitrile groups in its molecular structure.

4 Claims, 4 Drawing Figures

PATENTED MAR 27 1973          3,722,725

INVENTORS
BHUPENDRA N. KHETANI
EUGENE F. PHILLIPS

BY Michael J. Murphy
ATTORNEY

PACKAGE FOR PRESSURIZED FLUENT MATERIALS - A

BACKGROUND OF THE INVENTION

This invention relates to a package for holding pressurized fluent materials and more particularly to a composite package for such materials wherein the container portion is a thermoplastic bottle configured to minimize areas of high stress concentration present as a result of the pressure of the contents.

Containers for holding pressurized fluent materials such as carbonated beverages, beer and the like wherein the pressure rating of the container with suitable safety factors included may be within the range of from 200–300 psi, have traditionally been formed of glass, wall areas therein which are subject to highest stress being made thicker than other areas in order to provide the container with sufficient strength to withstand the rather substantial internal pressure. Thermoplastic bottles have recently appeared in the marketplace in competition with the more traditional glass containers for holding such materials. Such thermoplastic bottles have high consumer preferences since, generally speaking, they are shatter resistant under normal conditions of use, are more compatible with solutions to current ecological problems and are lightweight and consequently relatively easy to handle from the standpoint of both the retailer and the consumer.

The thermoplastic materials from which these bottles must be formed represent a special class of resins having unusually high tensile strength properties in order to withstand the pressures involved. Such materials are costly to synthesize and needless to say must be used as sparingly as possible in each article in order to realize the economies required for an efficient and profitable operation in a high volume production environment. This then means that the shape of the container should be utilized to whatever degree possible to keep stress buildup in the container at a minimum, to thereby minimize the amount of material necessary in each individual container.

It is generally known that stress concentration in a generally cylindrical pressurized container is greatest in the bottom or base area for shapes utilized in conventional self-supporting bottles, and consequently this is the area where the wall thickness of the container is usually the greatest. It is likewise generally known that a hemispherical base configuration takes maximum advantage of the tensile strength of the material since the surface area of such a shape per unit volume is smaller than any other base designs. Unfortunately, however, such a container configuration is incapable of supporting itself in an upright position on a horizontal surface and requires an auxiliary means of support.

A few shapes have appeared relatively recently in the prior art utilizing a base configuration approaching a hemispherical shape, but the means of support utilized has provided the overall package with a shape that is radically different from the more conventional bottles which have appeared in the marketplace for some time. Also, some of these packages have required the presence of separate strengthening bands around large portions of the bottle surface, apparently due to tensile strength deficiencies of the material utilized in forming the container.

SUMMARY OF THE INVENTION

Now, however, there has been developed a new package which overcomes the prior art deficiencies mentioned above.

Accordingly, it is a principal object of this invention to provide an improved package for holding pressurized fluent materials.

It is another object of this invention to provide a package of the type described having a high strength thermoplastic bottle component capable of being blow molded.

A further object of this invention is to provide a package of the aforementioned variety utilizing a bottle having a full hemispherical base configuration to minimize the stress buildup therein.

An additional object of this invention is to provide a blow molded bottle made of a high strength thermoplastic material having a hemispherical base with novel means thereon for cooperating with a support member such that the overall appearance of the assembled package is generally identical to conventional glass bottles.

Another object of this invention is to provide a package of the just mentioned variety wherein the support member cooperates with a portion of the bottle where stress buildup from the pressurized contents is relatively low in comparison with that in other portions of the bottle.

Yet another object of this invention is to provide cooperating bottle and support member sidewall structure such that the surface of each is flush with the other when the package is in assembled condition.

Other objects of this invention will in part be obvious and will in part appear hereinafter.

These and other objects are accomplished by providing a package for holding pressurized fluent materials comprising a bottle made of a high strength thermoplastic capable of being blow molded, said bottle having a sidewall, a hemispherical base at one end of the sidewall and a narrow neck with a dispensing opening therein at the other end of the sidewall, means for supporting the bottle on a flat surface, the supporting means at least in part surrounding the hemispherical base and terminating short of the upper end of the sidewall, and means in the lower portion of the bottle for cooperating with the supporting means to attach the supporting means to the bottle.

The cooperating means on the bottle preferably is an inwardly directed step in the general area of the junction of the bottle sidewall and its hemispherical base, with the diameter of the upper end of the sidewall of the support member being substantially the same as that of the major diameter of the bottle so that this upper end may seat a against the surface of the step, thus making the outer surfaces of the support member and bottle, in the area of the junction of each with the other, flush with each other when the package is in assembled condition.

The thermoplastic material utilized in the bottle is preferably a polymer, the major component of which is present therein at a level of between 51 to 98 weight percent, and which is formed from a monomer having at least one nitrile group therein plus at least one other monomer copolymerized therewith. The preferred major component is polymerized methacrylonitrile.

BRIEF DESCRIPTION OF THE DRAWINGS

In describing the invention, reference will be made to the accompanying drawings wherein.

DETAILED DESCRIPTION OF THE ILLUSTRATED EMBODIMENTS

Figure 1:
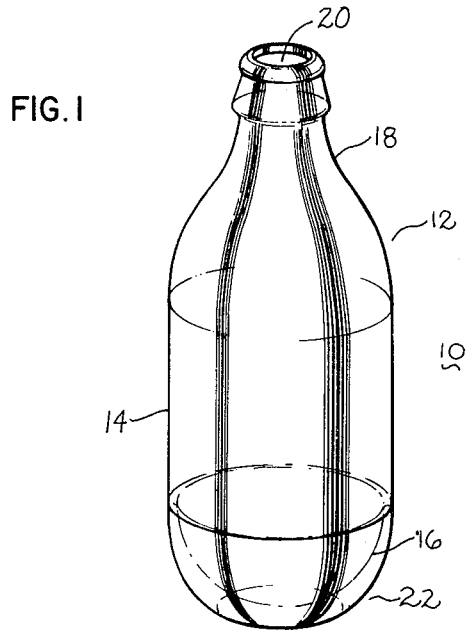
FIG. 1 is a perspective view of an assembled package embodying the present invention.

Referring now to the drawings, there is illustrated in FIG. 1, a package 10 for holding pressurized fluent materials. Package 10 comprises a bottle generally indicated as 12 made of a high strength thermoplastic having a tensile strength greater than 8,000 psi in order that it be suitable for holding the pressurized contents toward which the present invention is directed. Though the bottle is preferably clear in the sense that the color of contents may be readily viewed by a consumer, for some liquids such as beer, it may desirable that it be somewhat darker in the sense of having a low level of light transmittance. The thermoplastic of the bottle must be one which is capable of being molded into the final article shape from a tubular preform such as a parison formed by conventional techniques known to those skilled in the bottle forming art. Tubular parison is herein meant to include such preforms as are shaped either by injection molding techniques or by extrusion forming in an annular extrusion nozzle. Bottle 12 has a sidewall 14, a hemispherical base 16 at the lower end of sidewall 14 and a narrow neck 18 gradually tapering inwardly from the upper end of sidewall 14. Neck 18 has a dispensing opening 20 at its upper extremity. A conventional closure (not shown) for sealing opening 20 must be applied across opening 20 after the contents are deposited in the bottle. This closure may be in the form of a metallic crown or rip cap or roll-on variety. Though such closures are usually metallic, they may alternatively be made of thermoplastic.

Package 10 further comprises a shallow support member generally indicated as 22 (FIG. 2) for maintaining bottle 12 in an upright position on a flat horizontal surface, bottle 12 being otherwise incapable of this position because of the stress minimizing hemispherical base configuration 16. Support member 22 at least in part surrounds bottle base 16 and has a short sidewall 24 with a curved lower end 26 which blends smoothly into a bottom wall having a convex center portion 28 in contact with lower end 30 of hemispherical base 16 of bottle 12.

Figure 2:
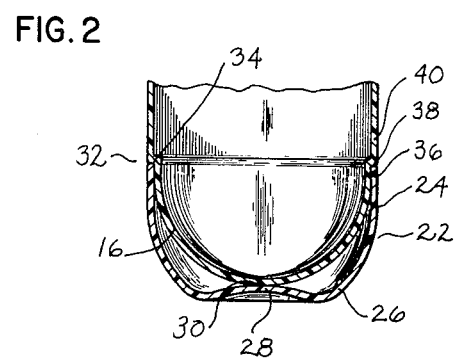
FIG. 2 is a partial, cross-sectional view of the lower portion of the package of FIG. 1.

Package 10 further comprises means 32 formed in bottle 12 for cooperating with support member 22 in order to attach the latter to the bottle. In the embodiment of FIGS. 1 and 2, these cooperating means comprise an inwardly directed step 34 in the area of the junction of sidewall 14 of the bottle with hemispherical base 16, the upper end 36 of sidewall 24 of support member 23 adapted to seal against surface 38 of step 34 such that the outer surfaces of the sidewall 24 of the support member and the lower end 40 of the bottle sidewall are flush with each other and lie in a generally common plane. This means that the outer diameter of the upper end of the support member is generally the same as the major diameter of the bottle, i.e. that of sidewall 14. In this way the assembled package is free of outwardly extending projections which distract from consumer appeal and tend to present problems from a handling standpoint on package assembly lines.

As can be seen from the embodiment of FIGS. 1 and 2, the overall appearance of the combined bottle and support member is generally the same to the eye as that of a rather conventional one piece glass bottle. The inside diameter of the sidewall 24 of support member 22 in the embodiment illustrated in FIGS. 1 and 2 is slightly less than the outside diameter of the hemispherical base in order that support member 22 remain attached to the bottle by means of a friction fit. The upper end of sidewall 24 of support member 22 generally speaking extends no further up the sidewall of the bottle than is necessary to provide the bottle with stable support. This is possible because of the high tensile strength of the special type of thermoplastic utilized in forming the bottle. Thus, for most commercially acceptable bottle sizes, the overall height of support member 22 is generally no more than 50 percent and preferably no more than 25 percent of the maximum height of the bottle.

Figure 3:
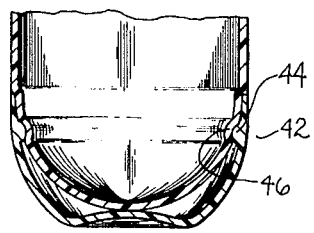
FIGS. 3 and 4 are views similar to FIG. 2 of aLternative forms of the bottom portion of the package.

In the embodiment illustrated in FIG. 3, the support member or means 42 for supporting the bottle on a flat surface comprises a cooperating projection 44 on the inner surface of the support member adapted to seat within an opposing cavity in the upper portion of the hemispherical base of the bottle being supported. Otherwise the structure is identical with that shown in FIGS. 1 and 2.

Figure 4:
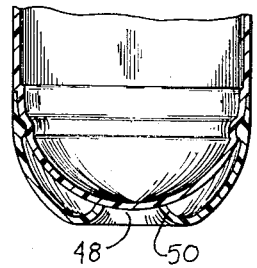

In the embodiment illustrated in FIG. 4, support means 48 is in the form of a shallow coaster having an open ended bottom with upwardly extending bottle supporting branches 50 formed therein which contact the lower surface of the hemispherical base as illustrated. Elimination of the bottom wall of the coaster may be desirable and is possible because the bottle is made of a high strength material and requires only a means of support rather than a protective cover around the lower end. In applications where the containers are subject to rough handling i.e. situations where the sealed bottle could receive a sharp blow from beneath, a bottom wall on the coaster may be necessary.

The location on the bottle of the means for cooperating with the support member is important. These means should be formed in an area of the bottle where stress level is relatively low, otherwise the change in surface configuration caused by such means may become limiting in the sense that the stress level thereat exceeds the tensile strength of the thermoplastic. The preferred location is either at the junction of the lower end of the sidewall with the hemispherical base, as illustrated in FIG. 2 or slightly lower, i.e. in the upper portion of the sidewall of the support member as illustrated in FIGS. 3 and 4.

As illustrated, the material of the support member for the bottle is preferably thermoplastic and most preferably of the same thermoplastic as that of which the bottle is formed. This enables the composite package to be deposited as a single integral unit in a waste disposal system designed to handle thermoplastic materials without separating the bottle from the support member. Thus, the complete package after use may be incinerated and/or ground up with virgin material and re-extruded without concern about either contaminating one material with the other or with indestructability of one of the members of the package.

The above description and particularly the drawings are set forth for purposes of illustration only and are not to be taken in a limited sense.

The overall shape of the bottle of the package of the present invention, with the exception of its base or lower portion, is intended to be generally similar to that of conventional carbonated beverage or beer containers. This means that the bottle diameter should be between 2 to 5 inches and should have a relatively narrow neck to facilitate consumption of the contents by the purchaser directly from the bottle. For such purposes, the size of the neck of the dispensing outlet of the bottle should be between 15 to 40 percent of the greatest diameter of the bottle occurring along the sidewall and generally ranges from between 25 to 50 mm.

The bottle must be formed of a high strength thermoplastic material capable of being blow molded, in order (a.) to be capable of withstanding the stresses generated as a result of the pressurized contents and (b.) to be capable of being formed by the extremely facile method of expansion within a blow mold. The combination of the stress minimizing hemispherical bottom configuration with the high strength thermoplastic permits utilization of bottle body wall thicknesses within the range of 20 to 60 mils without requiring the presence of bottle body strengthening bands which tend to detract from the overall appearance of the package. Analysis of stresses present in the hemispherical base area for projected internal pressures of from 200 to 300 psi have indicated that the stress levels along the sidewall of the bottle exceed those in the base area by a factor of about 2, thus unexpectedly providing basis for reducing the wall thickness in the base area over that of the sidewall, and incidentally eliminating the need for material consuming strengthening ribs etc. in the base area. It may, however, prove necessary in certain cases to supplement the base area with an incremental additional amount of material to compensate for rough handling encountered during filling and transporting of the containers before purchase by a consumer. This addition of material into the base defining portion of the bottle may be conveniently accomplished by well known parison programming techniques when the bottle is made of a blow moldable thermoplastic.

The high strength thermoplastic material from which the bottle of the package is made must be a polymeric material, the major component of which has been polymerized from a monomer containing at least one nitrile group in its molecular structure. This nitrile group bearing monomer when polymerized should be present at a level of from between 51 to 98 weight percent in the polymer in order to provide the bottle with the combination of properties which necessarily must be present in the thermoplastic in order that it be an effective material for packaging pressurized fluent materials such as carbonated beverages, beer, aerosols, etc. In addition to low oxygen and water vapor permeability values, this family of thermoplastics exhibits excellent resistance to failure by high speed impact and has a tensile strength value in excess of 8,000 psi, i.e. between 9,000 to 12,000 psi.

Typical of the materials suitable for use as the thermoplastic from which the bottles of the present invention may be formed are polymers containing a nitrile-group-containing monomer. The preferred monomer for this purpose is methacrylonitrile. Other monomers which may be employed are, for example, acrylonitrile, ethacrylonitrile, propacrylonitrile alphachloroacrylonitrile, alpha-bromoacrylonitrile, alpha-fluoroacrylonitrile, alpha-cyano-styrene, vinylidene cyanide, alpha-cyano acrylic acids, alpha-cyano acrylates such as alpha-cyano methyl acrylates, alpha-cyano ethyl acrylates, and the like, 2,3-dicyanobutene-2, 1,2-dicyanopropene-1, alpha-methylene glutaronitrile, and the like.

Any monomer or monomers which are copolymerizable with the nitrile group containing component of the polymer may be employed in the practice of this invention. Exemplary of such monomers are ethylenically unsaturated aromatic compounds such as styrene, alpha-methyl styrene, ortho-, meta-, and para-substituted alkyl styrenes, e.g., ortho-methyl styrene, ortho-ethyl styrene, para-methyl styrene, para-ethyl styrene, ortho-, meta-, or para- propyl styrene, ortho-, meta-, or para- isopropyl styrene, ortho-, meta-, para- butyl styrene, ortho-, meta-, or para-secondary butyl styrene, ortho-, meta-, or para- tertiary butyl styrene, etc., alpha-halogenated styrene, e.g., alpha-chlorostyrene, alpha-bromostyrene, ring-substituted halogenated styrenes, e.g., ortho-chlorostyrene, para-chloro-styrene, and the like; esters of ethylenically unsaturated carboxylic acids e.g., methyl acrylate, methyl methacrylate, ethyl methacrylate, ethyl acrylate, butylacrylate, propyl acrylate, butyl methacrylate, glycidol acrylate, glycidol methacrylate, and the like, ethylenically unsaturated acids, carboxylic acids such as acrylic acid, methacrylic acid, propacrylic acid, crotonic acid, and the like. Vinyl esters, e.g., vinyl formate, vinyl acetate, vinyl propionate, vinyl butyrate, etc.; vinyl and vinylidene halides, e.g., vinyl chloride, vinyl bromides, vinylidene chloride, vinylidene chloride, vinyl fluorides, etc.; vinyl ethers, e.g., methyl vinyl ether, ethyl vinyl ether, alpha-olefins, e.g., ethylene, propylene, butene, pentene, hexene, heptene, octene, isobutene, and other isomers thereof.

This invention also contemplates the use of a synthetic or natural rubber components such as, for example, polybutadiene, butadiene-styrene copolymers, isoprene, neoprene, nitrile rubbers, acrylate rubbers, natural rubbers, inter-polymers of butadiene with acrylonitrile, methacrylonitrile, tertiary butyl styrene, styrene and mixtures thereof such as acrylonitrile-butadiene co-polymers, methacrylonitrile-butadiene copolymer, acrylonitrile-styrene-butadiene terpolymers, methacrylonitrile-styrene-butadiene terpolymers, methacrylonitrile-tertiarybutyl styrene-butadiene terpolymers, acrylonitrile-tertiarybutyl styrene-butadiene terpolymers, ethylene-propylene copolymers, chlorinated rubbers, etc., which are if used to strengthen or toughen the materials prepared from the compositions of this invention. This rubbery component may be incorporated into the polymers of this invention by any of the methods which are well known to those skilled in the art, e.g., direct polymerization of monomers, polyblends, grafting the monomer mixture onto the rubbery backbone, physical admixture of the rubbery component, etc.

In view of the bottle design and the type of thermoplastic used, the support member of the present invention serves only to enable the hemispherical bottomed container to be supported on a horizontal surface and does not function as a strength imparting member of the package. In addition to the illustrated cooperating means on the bottle and support member for attaching the latter to the former, a projection, either continuous or interrupted may be formed in the bottle during blowing which is sized to snap into an opposing depression(s) in the support member to fasten the two together. Preferably, the bottle is snapped into place in the support member such that there are no projecting portions at the joint between the two in order to provide the assembled package with uniformity of exterior dimensions and contour. This type of cooperating attachment eliminates the need for a separate adhesive application step in assembling the package.

Various modifications and alterations will be readily suggested to persons skilled in the art. It is intended, therefore, that the foregoing be considered as exemplary only and that the scope of the invention be ascertained from the following claims.

What is claimed is:

1. A package for holding pressurized fluent materials comprising:
    a. a bottle made of a high strength thermoplastic capable of being blow molded comprising a polymer, the major component of which is formed from a monomer having at least one nitrile group plus at least one other monomer copolymerized therewith, said bottle having a sidewall, a hemispherical base at one end of said sidewall and a narrow neck with a dispensing opening therein at the other end of said sidewall, the wall thickness of said hemispherical base being less than that of said sidewall;
    b. a shallow support member for maintaining said bottle in an upright position on a flat surface, said support member at least in part surrounding said hemispherical base and having a sidewall with an inwardly curving smooth surfaced lower end blending smoothly into a bottom wall having a convex central portion, inner surface section of which is in contact with the lower end of the hemispherical base of the bottle; and
    c. an inwardly directed step in the area of the junction of said bottle sidewall and hemispherical base, the upper end of the sidewall of said support member adapted to seat within and against the surface of said step such that the outer surfaces of the support member and bottle are flush with each other.

2. The package of claim 1 wherein the amount of the major component in the polymer is between 51 to 98 weight percent.

3. The package of claim 1 wherein the tensile strength of the thermoplastic is greater than 8,000 psi.

4. The package of claim 1 wherein the major component in the polymer is polymerized methacrylonitrile.

* * * * *